(12) United States Patent
Tolentino

(10) Patent No.: US 10,962,136 B2
(45) Date of Patent: Mar. 30, 2021

(54) MAGNETIC LATCH VALVE

(71) Applicant: Aerojet Rocketdyne, Inc., Sacramento, CA (US)

(72) Inventor: Arturo Tolentino, Redmond, WA (US)

(73) Assignee: AEROJET ROCKETDYNE, INC., Redmond, WA (US)

( * ) Notice: Subject to any disclaimer, the term of this patent is extended or adjusted under 35 U.S.C. 154(b) by 0 days.

(21) Appl. No.: 15/560,732

(22) PCT Filed: Apr. 12, 2016

(86) PCT No.: PCT/US2016/027010
§ 371 (c)(1),
(2) Date: Sep. 22, 2017

(87) PCT Pub. No.: WO2016/178799
PCT Pub. Date: Nov. 10, 2016

(65) Prior Publication Data
US 2018/0051822 A1 Feb. 22, 2018

Related U.S. Application Data

(60) Provisional application No. 62/156,236, filed on May 2, 2015.

(51) Int. Cl.
*F16K 31/08* (2006.01)

(52) U.S. Cl.
CPC ................. *F16K 31/082* (2013.01)

(58) Field of Classification Search
CPC ....... F16K 31/082; F16K 31/02; F16K 31/084
USPC ................. 251/64, 129.02, 129.15
See application file for complete search history.

(56) References Cited

U.S. PATENT DOCUMENTS

| 3,361,161 | A | | 1/1968 | Schwartz | |
|---|---|---|---|---|---|
| 4,383,234 | A | | 5/1983 | Yatsushiro et al. | |
| RE32,783 | E | * | 11/1988 | Clark | H01F 7/13 335/261 |
| 6,246,131 | B1 | * | 6/2001 | Sheng | F16K 31/082 310/12.19 |
| 6,932,584 | B2 | * | 8/2005 | Gray | A61M 5/14216 310/12.01 |
| 7,320,456 | B2 | * | 1/2008 | Yajima | F16K 31/086 137/523 |
| 7,509,974 | B2 | * | 3/2009 | Wu | F16K 31/08 137/391 |
| 8,500,087 | B2 | * | 8/2013 | Cheng | F16K 31/404 251/129.15 |

(Continued)

FOREIGN PATENT DOCUMENTS

| CN | 101709806 | 5/2010 |
|---|---|---|
| CN | 103560052 | 2/2014 |

(Continued)

OTHER PUBLICATIONS

International Preliminary Report on Patentability for PCT/US2016/027010 dated Nov. 16, 2017.

(Continued)

*Primary Examiner* — Umashankar Venkatesan
*Assistant Examiner* — Andrew J Rost

(57) ABSTRACT

A latch valve includes a ferromagnetic shell, a ferromagnetic pole, a permanent magnet, an electromagnet, and a ferromagnetic plunger that is disposed within the ferromagnetic shell.

8 Claims, 3 Drawing Sheets

(56) References Cited

U.S. PATENT DOCUMENTS

| | | | | |
|---|---|---|---|---|
| 8,576,032 B2* | 11/2013 | Herbert | ............... | F16K 7/16 |
| | | | | 251/129.15 |
| 8,833,732 B2* | 9/2014 | Heiko | ............... | F16K 31/082 |
| | | | | 251/129.15 |
| 2006/0163512 A1* | 7/2006 | Ogawa | ............... | G05D 16/2022 |
| | | | | 251/129.15 |
| 2011/0073790 A1* | 3/2011 | Ko | ............... | F16K 31/0675 |
| | | | | 251/129.15 |
| 2014/0319392 A1* | 10/2014 | Schumacher | ............... | H01F 7/081 |
| | | | | 251/129.15 |

FOREIGN PATENT DOCUMENTS

| | | |
|---|---|---|
| EP | 1219877 | 7/2002 |
| JP | S57100707 A | 6/1982 |

OTHER PUBLICATIONS

International Search Report for International Application No. PCT/US2016/027010 completed Jun. 30, 2016.

\* cited by examiner

MAGNETIC LATCH VALVE

REFERENCE TO RELATED APPLICATIONS

This application claims priority to U.S. Provisional Application No. 62/156,236, filed on May 2, 2015.

BACKGROUND

Throttle valves, check valves, and the like typically include a valve member to control fluid flow. Such valves often include an internal spring that biases the valve member to a default position, for example. Close tolerances of the spring, valve member, and valve housing are also often required in order to obtain the desired operation. Because of the close tolerances, several iterations of adjustments are needed during assembly.

SUMMARY

A latch valve according to an example of the present disclosure includes a ferromagnetic shell, a ferromagnetic pole, a permanent magnet, an electromagnet, and a ferromagnetic plunger disposed within the shell.

A further embodiment of any of the foregoing embodiments includes a liner fluidly isolating the ferromagnetic plunger from the permanent magnet and the electromagnet.

In a further embodiment of any of the foregoing embodiments, the permanent magnet and the electromagnet are co-axially arranged.

In a further embodiment of any of the foregoing embodiments, the ferromagnetic pole is also co-axially arranged with the permanent magnet and the electromagnet.

In a further embodiment of any of the foregoing embodiments, the ferromagnetic plunger includes a ferromagnetic core.

In a further embodiment of any of the foregoing embodiments, the ferromagnetic plunger includes a jacket sealing the ferromagnetic core.

In a further embodiment of any of the foregoing embodiments, the jacket is a titanium-based alloy.

A further embodiment of any of the foregoing embodiments includes a poppet valve integral with the ferromagnetic plunger.

A further embodiment of any of the foregoing embodiments includes a poppet valve mechanically coupled with the ferromagnetic plunger.

A latch valve according to an example of the present disclosure includes a magnetic chamber that defines a magnetic circuit, and a magnetic valve member disposed in the magnetic chamber. The magnetic valve member is moveable in the magnetic chamber between at least first and second valve positions, and an electromagnet is configured to generate a magnetic field that is reversible between first and second magnetic field directions. The first magnetic field direction is operable to move the magnetic valve member from the first valve position to the second valve position and the second magnetic field direction is operable to move the magnetic valve member from the second valve position to the first valve position.

A further embodiment of any of the foregoing embodiments includes a permanent magnet operable to hold the magnetic valve member in the first position in the absence of the magnetic field of the electromagnet.

In a further embodiment of any of the foregoing embodiments, the permanent magnet and the electromagnet are co-axially arranged.

In a further embodiment of any of the foregoing embodiments, the magnetic chamber includes a shell encompassing the electromagnet and the magnetic valve member.

In a further embodiment of any of the foregoing embodiments, the magnetic chamber includes a liner located radially inwards of the shell, the liner fluidly isolating the magnetic valve member from the electromagnet.

In a further embodiment of any of the foregoing embodiments, the magnetic valve member includes a ferromagnetic core and a jacket sealing the ferromagnetic core.

In a further embodiment of any of the foregoing embodiments, the jacket is a titanium-based alloy.

In a further embodiment of any of the foregoing embodiments, the magnetic chamber is free of any mechanical springs.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
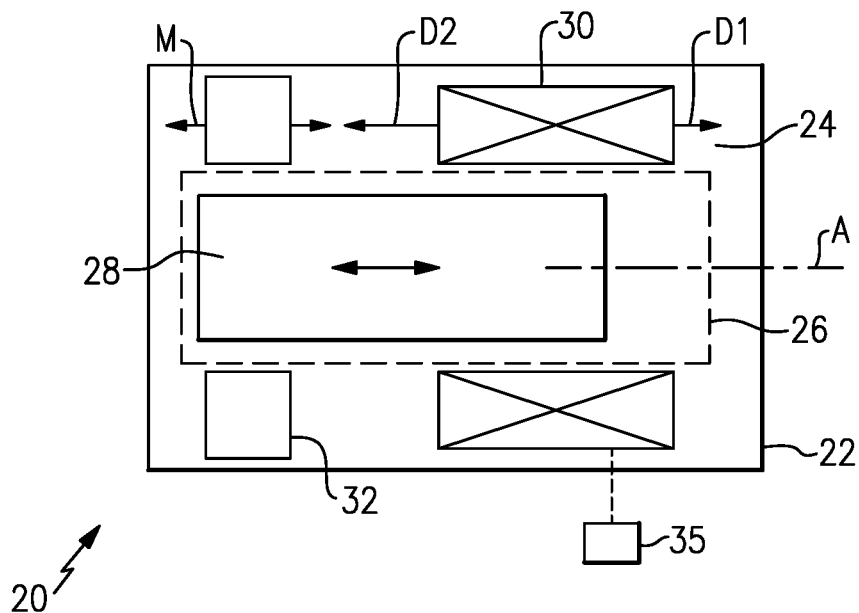
FIG. 1 illustrates an example latch valve in a first position.

FIG. 1 schematically illustrates an example of a latch valve 20. As will be described, the latch valve 20 uses magnetic fields, rather than a mechanical spring, to open and close the valve. As will be appreciated, the latch valve 20 is depicted as a check valve, but other types of valves may also benefit from this disclosure.

Figure 2:
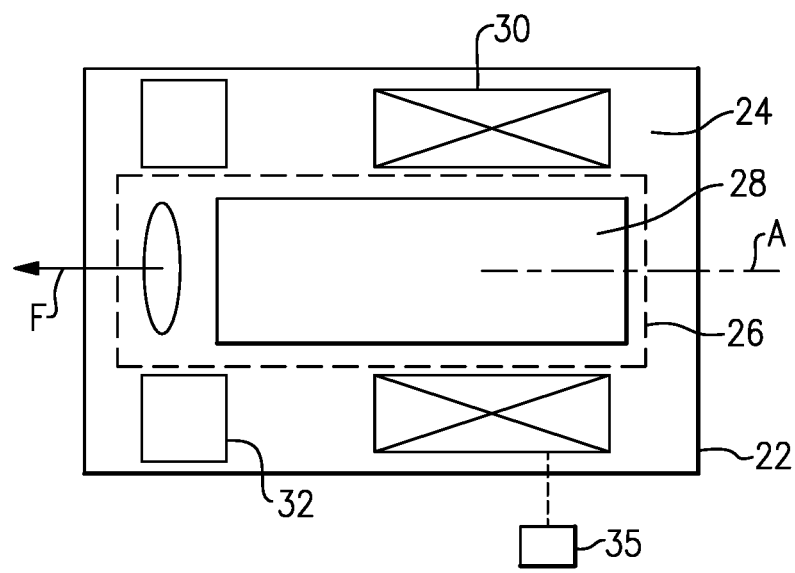
FIG. 2 illustrates the latch valve of FIG. 1 but in a second position.

In this example, the latch valve 20 includes a magnetic chamber 22 that defines a magnetic circuit 24. For instance, the magnetic chamber 22 is formed of a ferromagnetic material that guides and controls the magnetic field. The magnetic chamber 22 includes an internal cavity 26 in which a magnetic valve member 28 is disposed. For example, the magnetic valve member 28 may be, but is not limited to, a ferromagnetic plunger with a poppet. The magnetic valve member 28 is moveable in the magnetic chamber 22 between at least first and second valve positions. FIG. 1 shows the magnetic valve member 28 in the first, closed position; and FIG. 2 shows the magnetic valve member 28 in the second, open position. As can be appreciated, the magnetic valve member 28 is not limited to two positions and there may be additional or intermediate positions.

The latch valve 20 further includes an electromagnet 30, such as a coil, that is disposed as an annular structure around a central axis A. The electromagnet 30 is configured to generate a magnetic field that is reversible between first and second magnetic field directions, as generally represented at D1 and D2. The first magnetic field direction D1 is operable to move the magnetic valve member 28 from the first valve position (FIG. 1) to the second valve position (FIG. 2), and the second magnetic field direction D2 is operable to move the magnetic valve member 28 from the second valve position to the first valve position. In the example shown, the second position opens fluid flow F through the latch valve 20.

The latch valve 20 may also include a magnetic latch 32 in the form of an annular permanent magnet, for example.

The magnetic latch 32 also generates a magnetic field, as represented at M (FIG. 1). In the first position, the magnetic valve member 28 is within the magnetic field M. The magnetic field M attracts the magnetic valve member 28 and thus magnetically holds, or "latches," the magnetic valve member 28 in the first position when the electromagnet 30 is inactive. When the electromagnet 30 is activated in magnetic field direction D1, the magnetic field of the electromagnet 30 overcomes the magnetic field M of the magnetic latch 32 to attract the magnetic valve member 28 to the second position, where it remains until the electromagnet 30 is activated in the opposite magnetic field direction D2.

A controller 35 may be electrically connected with the electromagnet 30, to control operation thereof. In this regard, the controller 35 may include software, hardware, such as a microprocessor, or both to control the magnetic field and magnetic field directionality D1/D2 of the electromagnet 30 as described herein.

Figure 3:
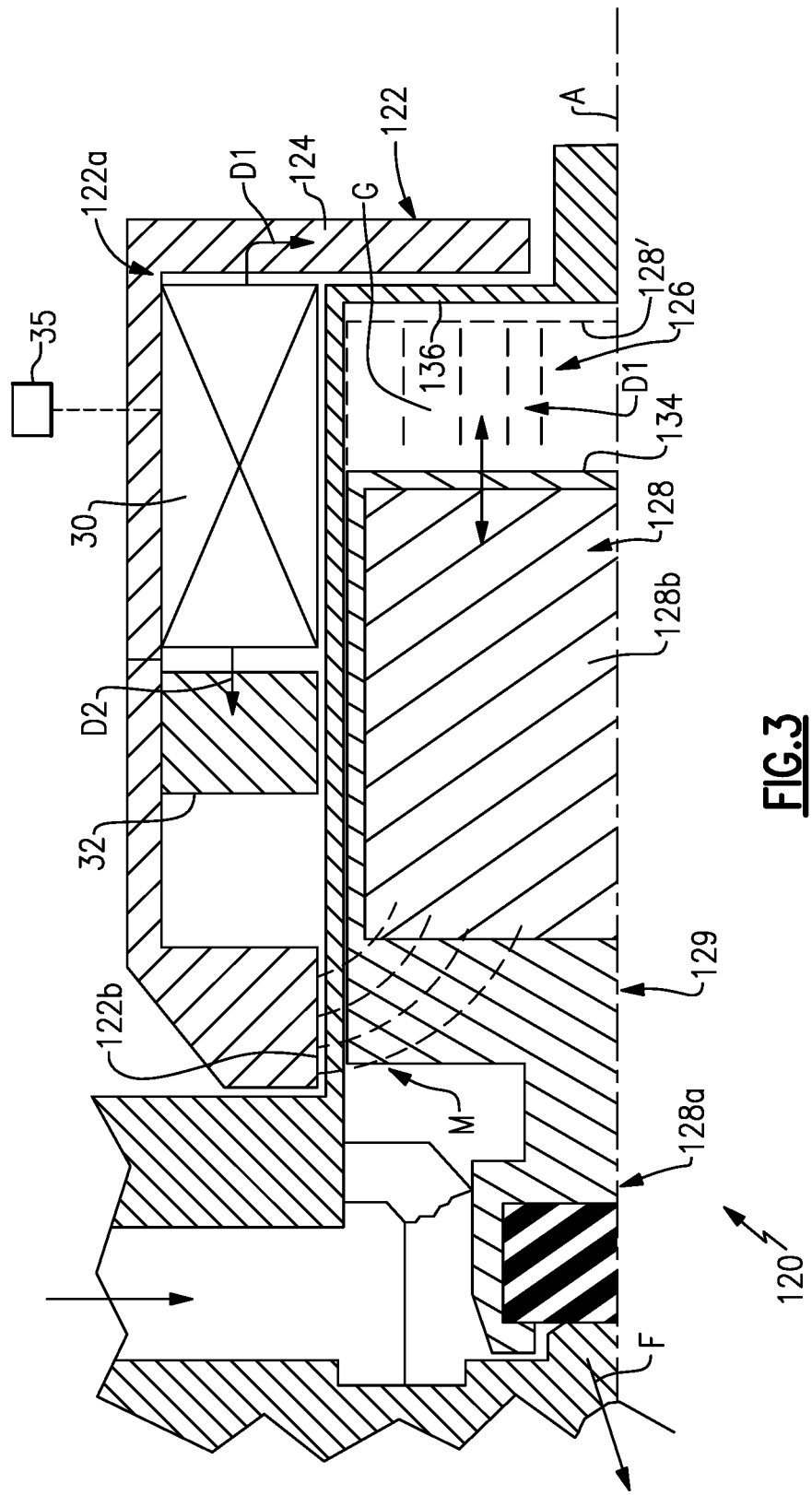
FIG. 3 illustrates another example latch valve.

FIG. 3 illustrates another example of a latch valve 120, which is symmetric about the central axis A. In this disclosure, like reference numerals designate like elements where appropriate and reference numerals with the addition of one-hundred or multiples thereof designate modified elements that are understood to incorporate the same features and benefits of the corresponding elements. In this example, the magnetic chamber 122 includes a ferromagnetic shell 122a that has a ferromagnetic pole 122b. The ferromagnetic shell 122a and the pole 122b form, at least in part, the magnetic circuit 124. For instance, the ferromagnetic shell 122a is formed of a ferromagnetic material that guides and controls the magnetic field. The ferromagnetic shell 122a defines the internal cavity 126 in which the magnetic valve member 128 is disposed. In this example, the magnetic valve member 128 includes a ferromagnetic plunger 129 that is integral with a poppet 128a.

In the example shown, the magnetic valve member 128 includes a ferromagnetic core 128b that facilitates magnetic interaction with the magnetic fields of the electromagnet 30 and magnetic latch 32 (permanent magnet). The magnetic valve member 128 also includes a jacket 134 that seals the ferromagnetic core 128b. For instance, the fluid conveyed through the latch valve 120 may react with the ferromagnetic material of the core 128b. The jacket 134 thus serves as a barrier to protect the core 128b. In one example, the jacket 134 is a titanium-based alloy, which may be suitable for exposure to rocket propellant materials.

The latch valve 120 also includes a liner 136 inside of the ferromagnetic shell 122a. The liner 136 fluidly isolates the magnetic valve member 128 from the electromagnet 30 and the magnetic latch 32. Thus, although there may be fluid in the cavity 126, the electromagnet 30 and the magnetic latch 32 are not directly exposed to the fluid.

In the illustrated example, the electromagnet 30 and the magnetic latch 32 are co-axially arranged about the central axis A. The ferromagnetic pole 122b is axially forward of the magnetic latch 32 and is thus also co-axially arranged with the electromagnet 30 and the magnetic latch 32. Further, as shown in FIG. 3, the ferromagnetic pole 122b is axially-spaced apart from the magnetic latch 32 such that there is an axial gap between the ferromagnetic pole 122b and the magnetic latch 32. The co-axial layout thus provides a relatively compact arrangement, which also facilitates assembly.

The electromagnet 30 is configured to generate (e.g., via the controller 35) a magnetic field that is reversible between first and second magnetic field directions D1/D2, and the magnetic latch 32 generates a magnetic field M at the ferromagnetic pole 122b. The first magnetic field direction D1 is operable to move the magnetic valve member 28 from the first valve position (FIG. 3) to the second valve position (shown at dashed line 128'), and the second magnetic field direction D2 is operable to move the magnetic valve member 28 from the second valve position to the first valve position. In the example shown, the second position opens fluid flow F through the latch valve 120. In the first position, the magnetic valve member 128 is within the magnetic field M. The magnetic field M attracts the magnetic valve member 128 and thus magnetically holds, or "latches," the magnetic valve member 128 in the first position when the electromagnet 30 is inactive. When the electromagnet 30 is activated in magnetic field direction D1, the magnetic field of the electromagnet 30 across gap G overcomes the magnetic field M of the magnetic latch 32 to move the magnetic valve member 128 to the second position, where it remains until the electromagnet 30 is activated in the opposite magnetic field direction D2.

Figure 4:
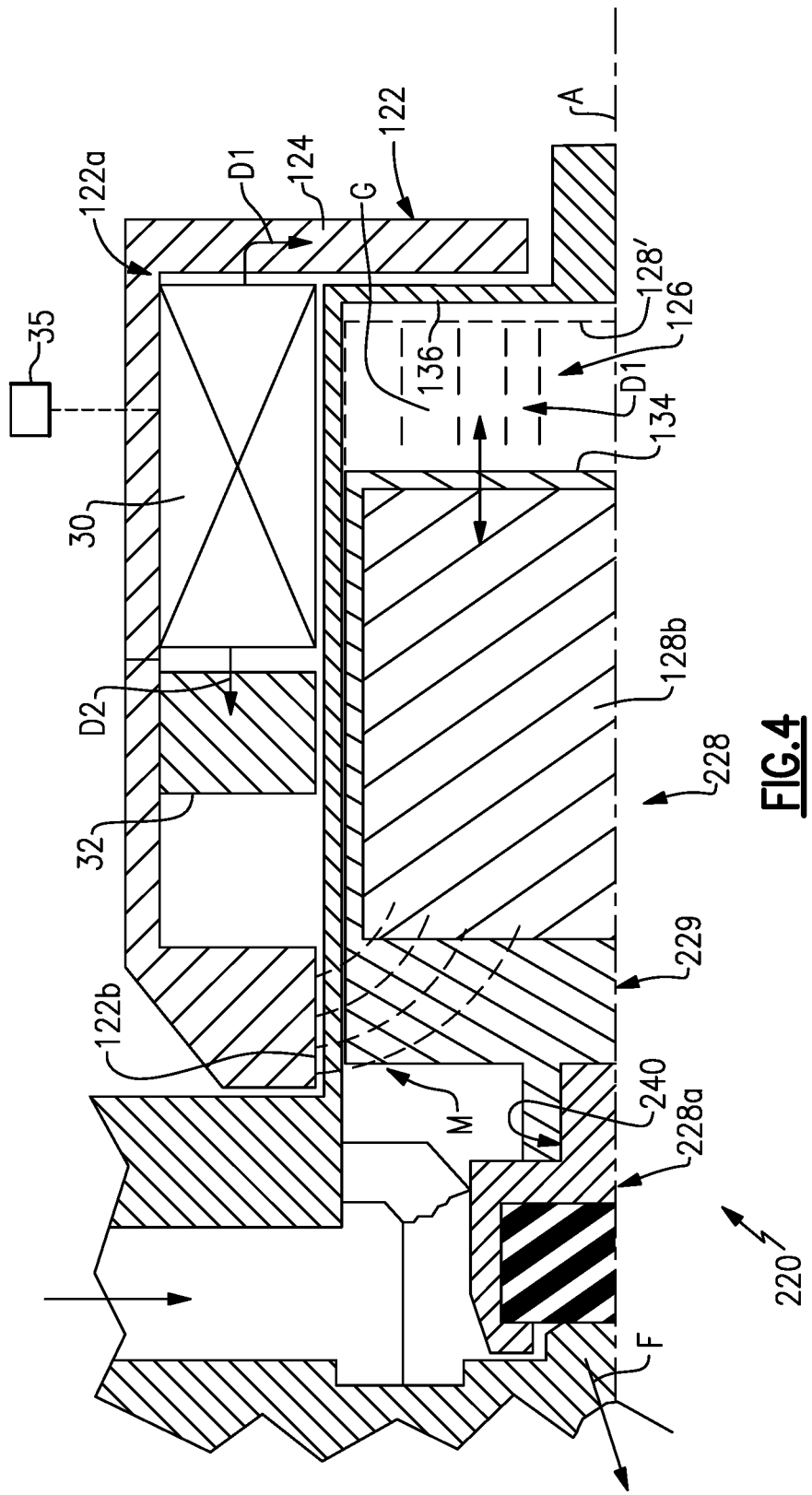
FIG. 4 illustrates another example latch valve.

FIG. 4 illustrates another example of a latch valve 220, which is symmetric about the central axis A. The latch valve 220 is similar to the latch valve 120 but rather than the magnetic valve member 128 that has a magnetic plunger 129 that is integral with the poppet 128a, the latch valve 220 includes a magnetic valve member 228 with a poppet 228a and a ferromagnetic plunger 229 that are separate and distinct pieces. The ferromagnetic plunger 229 and the poppet 228a are mechanically coupled together such that the poppet 228a moves in unison with the ferromagnetic plunger 229. In this example, the poppet 228a is mechanically coupled with the plunger 228b via an interference-fit, or friction-fit, connection 240. Additionally or alternatively, other types of mechanical couplings could be used, such as but not limited to, mechanical fasteners and mechanically interlocking connections.

The latch valve 120/220 may also provide relatively easy assembly and reduce the need for assembly adjustments. For instance, the latch valve 120/220 may be assembled by inserting the magnetic valve member 128/228 into the liner 136 followed by inserting the ferromagnetic shell 122a about the liner 136. The magnetic latch 32 and the electromagnet 30 are then, respectively, inserted into the annular gap between the liner 136 and the ferromagnetic shell 122a. The ferromagnetic shell 122a may be provided in several pieces to further facilitate assembly, and the assembly may be held together using spring washers, fasteners, or the like. The latch valves 20/120/220 are also free of any mechanical springs and there is thus no need for reiterative adjustment during assembly to hone the spring load or gaps. In this regard, the latch valve 20/120/220 can utilize relatively large gaps and omit tolerances that would otherwise be necessary for proper operation of a mechanical spring. In essence, the magnet 32 serves as a dynamically adjustable magnetic "spring."

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A latch valve comprising:
    a ferromagnetic shell having a ferromagnetic pole;
    a permanent magnet;
    an electromagnet;
    a ferromagnetic plunger disposed within the shell, wherein the ferromagnetic plunger includes a ferromagnetic core, and wherein the ferromagnetic plunger includes a jacket sealing the ferromagnetic core; and
    a liner fluidly isolating the ferromagnetic plunger from the permanent magnet and the electromagnet,
    wherein the latch valve is free of mechanical springs,
    wherein the permanent magnet is arranged axially between the ferromagnetic pole and the electromagnet,
    wherein the permanent magnet, electromagnet, and ferromagnetic pole are each arranged radially outward of the ferromagnetic plunger, and
    wherein the ferromagnetic pole is axially spaced-apart from the permanent magnet such that there is an axial gap between the ferromagnetic pole and the permanent magnet.

2. The latch valve as recited in claim 1, wherein the permanent magnet and the electromagnet are co-axially arranged.

3. The latch valve as recited in claim 2, wherein the ferromagnetic pole is also co-axially arranged with the permanent magnet and the electromagnet.

4. The latch valve as recited in claim 1, wherein the jacket is a titanium-based alloy.

5. The latch valve as recited in claim 1, further comprising a poppet valve integral with the ferromagnetic plunger.

6. The latch valve as recited in claim 1, further comprising a poppet valve mechanically coupled with the ferromagnetic plunger.

7. The latch valve as recited in claim 1, wherein the ferromagnetic shell has a main section and a flange projecting radially inward of the main section, and wherein the pole is provided adjacent a radially inner surface of the flange.

8. The latch valve as recited in claim 7, wherein the permanent magnet is axially spaced-apart from the flange.

* * * * *